United States Patent [19]

Penjaska

[11] Patent Number: 5,714,686
[45] Date of Patent: Feb. 3, 1998

[54] CHAMFER ANGLE CHECK GAGE

[76] Inventor: Paul A. Penjaska, 2220 W. Mason Rd., Owosso, Mich. 48867

[21] Appl. No.: 764,730

[22] Filed: Nov. 27, 1996

[51] Int. Cl.$^6$ .................................. G01F 15/14; G01B 3/56
[52] U.S. Cl. ........................................ 73/432.1; 33/536
[58] Field of Search .............................. 73/432.1; 33/1 N, 33/531, 534, 536, 537, 538, DIG. 15

[56] References Cited

U.S. PATENT DOCUMENTS

| | | | |
|---|---|---|---|
| 2,472,306 | 6/1949 | Minuto | 33/536 X |
| 2,642,670 | 6/1953 | Dow | 33/536 X |
| 2,975,524 | 3/1961 | Field | 33/534 |
| 4,905,378 | 3/1990 | Culver et al. | 33/531 X |
| 5,251,381 | 10/1993 | Turner et al. | 33/534 X |
| 5,410,818 | 5/1995 | Chalk | 33/351 X |

FOREIGN PATENT DOCUMENTS

| | | |
|---|---|---|
| 1164682 | 3/1964 | Germany . |
| 61-169701 | 7/1986 | Japan . |
| 418654 | 2/1967 | Switzerland . |

*Primary Examiner*—George M. Dombroske
*Assistant Examiner*—Paul D. Amrozowicz

[57] ABSTRACT

This invention relates to an instrument for measuring the degree of an internal chamfer and comprises a cylinder (5) which is moved axially within a housing (1) and having three equally spaced longitudinal slots (16) therethrough; a knurled handle (3) for sliding the cylinder within the housing; a set screw (4) in the handle for selectively locking and unlocking an indicator gage to the cylinder; a piston (6) slidably disposed in the cylinder and contacting the indicator gage point (7); a spring (11) biasing the piston from the indicator stem (15); three equally spaced link blades (8) extendable through the corresponding slots in the cylinder of which one end of each link blade is pivotally mounted to piston and the other end of the link blade of the respective set is pivotally attached to one end of one corresponding blade of a set of three measuring blades (9) and the other end of the respective blade of the set of measuring blades being pivotally fastened to the lower end (10) of the cylinder which is reduced to the same diameter as the piston. Three dog point set screws (12), equally spaced, are aligned with corresponding slots in the cylinder. A plate (13) having three radial slots in alignment with the three sets of link and measuring blades is disposed on lower end of housing.

1 Claim, 2 Drawing Sheets

CHAMFER ANGLE CHECK GAGE

BACKGROUND

1. Field of Invention

This invention relates to the measurement of the degree of angle of interior chamfers.

2. Description of Prior Art

Gages on the market today that measure the degree of angle of an internal chamfer determine the angle by measuring the distance between two pins of 0.100 difference in diameter that contact the angle at two different points. One larger diameter pin contacts the angle near the top and the other smaller diameter pin contacts the angle near the bottom. This means the gage pins must be changed for relatively small difference in chamfer diameters (0.100), thus wasting time. On a large degree of included angle the pins would contact only a small portion of the angle. These pins, being round, cannot measure out of roundness.

SUMMARY OF THE INVENTION

A principal object of this invention is to provide a quick and easy way of measuring the degree of the included angle of an internal chamfer.

Another object of this invention is to provide a greater range of measurement of the included angle of an internal chamfer.

Referring now to the accompanying drawings.

Figure 1:
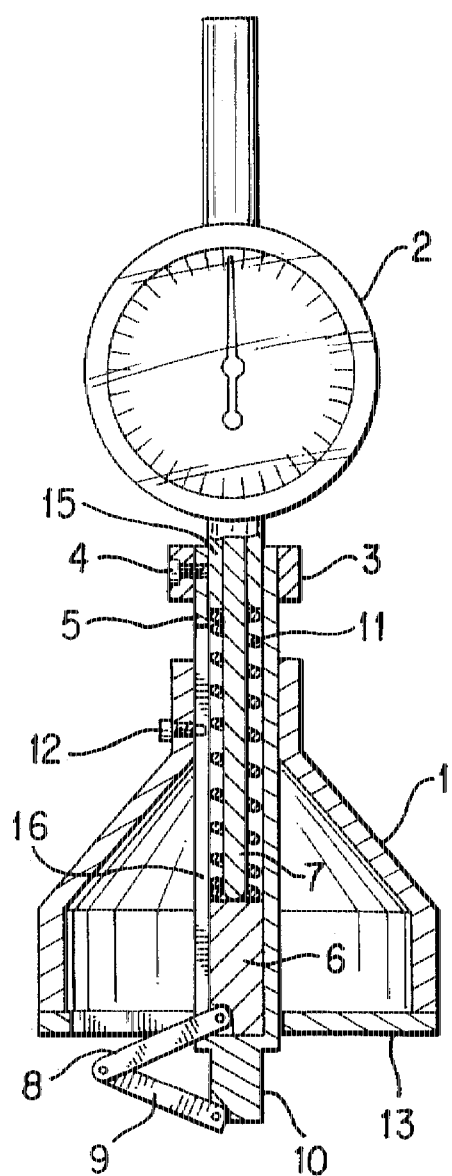
FIG. 1 is a cross section of an instrument according to the invention.

Referring to FIG. 1, Chamfer Angle Check Gage consists of a housing 1; a dial indicator 2 graduated in degrees of the range of the chamfer gage; a knurled handle 3 with set screw 4 that selectively locks and unlocks indicator by its stem 15 to cylinder 5 through a hole in cylinder wall. Cylinder 5 is slidably disposed in housing 1. It has three equally spaced longitudinal slots 16 therethrough. The interior of the cylinder contains a piston 6 slidably disposed in the cylinder 5 and contacting indicator point 7. A movement of the piston is thereby recorded on dial 2. One end of each of three equally spaced link blades 8 extendable through corresponding cylinder slots is pivotally fastened to piston. The other end of each of the three link blades 8 is pivotally fastened to one end of each of the three corresponding measuring blades 9. The other end of each of the measuring blades 9 is pivotally fastened to the bottom 10 of the cylinder 5 which is reduced to the same diameter as piston 6. A spring 11 biasing the piston 6 from the indicator stem maintains downward pressure on the piston which closes the blades to maximum included angle of chamfer gage when not measuring. Three dog point set screws 12, equally spaced, are aligned with cylinder slots and protrude into the slots but do not enter into the interior of cylinder. Their purpose is to align blades with plate 13 slots to allow the blades to pass through to measure chamfer angles.

Figure 2:
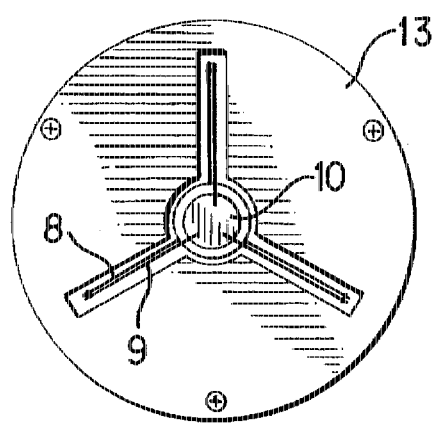
FIG. 2 is the bottom end view of instrument taken from FIG. 1.

FIG. 2 shows the plate 13 fastened to the bottom of the housing. It has three equally spaced slots that allow each of the three sets of link and measuring blades to pass through to measure chamfer angles.

Figure 3:
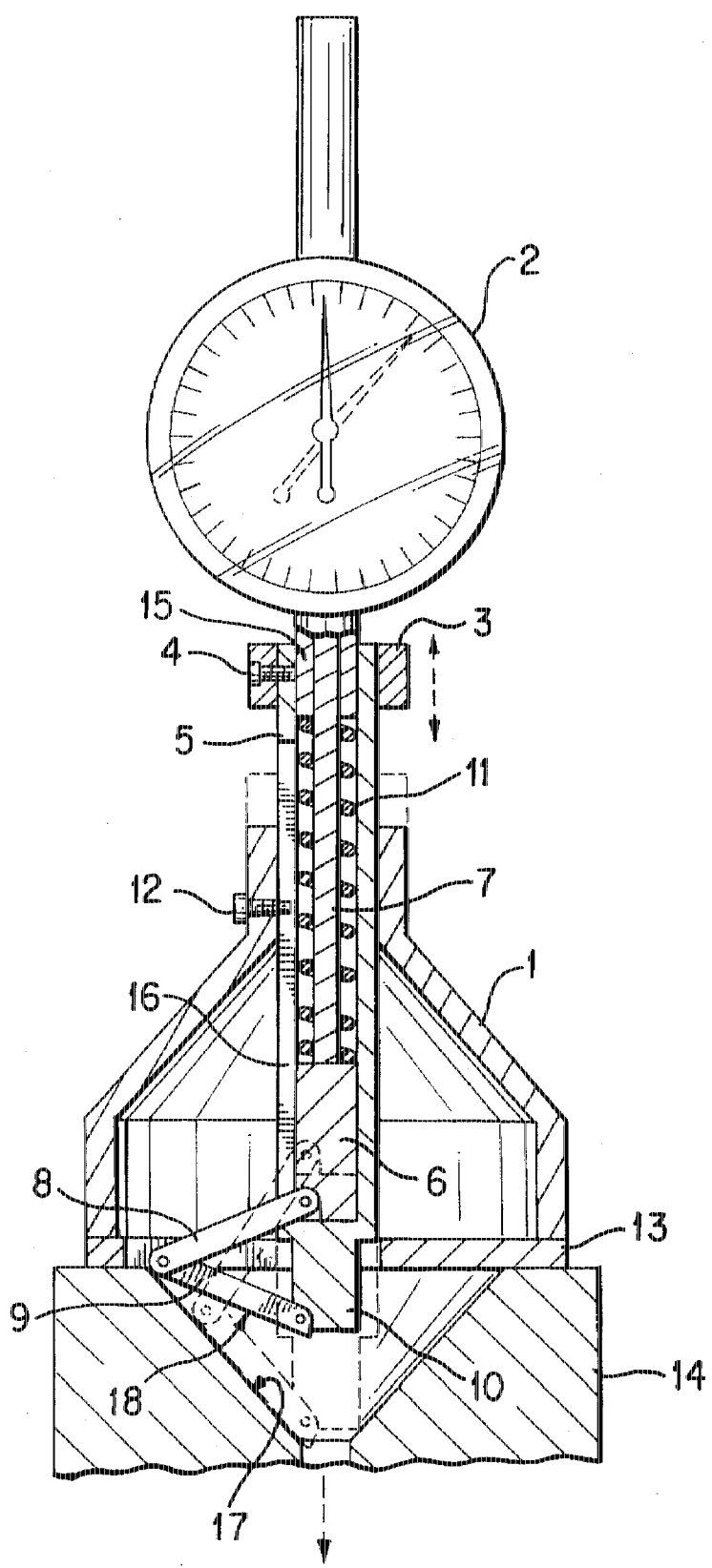
FIG. 3 shows the instrument in gaging position contacting the upper diameter of chamfer angle before cylinder is pushed downward blades shown in solid lines) and after cylinder is pushed downward, wherein measuring blades make full contact with chamfer angle (broken lines).

FIG. 3 shows how the gage is positioned on the face of the work 14 with the bottom 18 of the measuring blades 9 in gaging position, contacting the upper diameter of the chamfer. By pushing down on knurled handle 3, the blades in this position form a line contact 17 with the angle of chamfer. This forces the piston 6 upward by the scissor action of the three sets of link and measuring blades thereby registering twice the cosine value of one half of the included angle of chamfer. The indicator dial is calibrated to transform this reading into the degree of the included angle of said chamfer.

What is claimed is:

1. A measuring instrument for measuring internal chamfers, comprising:

a housing having an upper and lower end;

a cylinder, having an upper and lower end, slidably disposed within the housing and having a plurality of longitudinal slots therethrough, and the lower end having a reduced diameter;

an indicator gage releasably attached to the upper end of the cylinder, and having an indicator gage point extending therefrom into the cylinder;

a means of selectively locking, and unlocking, the indicator gage to, and from, the cylinder;

a handle on the cylinder, used to move the cylinder upward or downward in the housing;

a piston, having a diameter corresponding substantially with the reduced diameter of the cylinder, slidably disposed within the cylinder and contacting the indicator gage point;

a spring disposed between the indicator gage and the piston, biasing the piston away from the indicator;

a plurality of blade sets, each set comprising a link blade and a measuring blade, extendable through the corresponding plurality of longitudinal slots in the cylinder, wherein one end of each link blade is pivotally mounted to the piston, and the other end is pivotally attached to one end of the measuring blade of the corresponding set, and the other end of the measuring blade of the respective set being pivotally attached to the lower end of the cylinder;

a plate disposed on the lower end of the housing and having a plurality of slots in alignment with the blade sets, to allow the blade sets to pass therethrough; and, means for aligning the slots in the cylinder with the slots in the plate.

* * * * *